Figure 1:
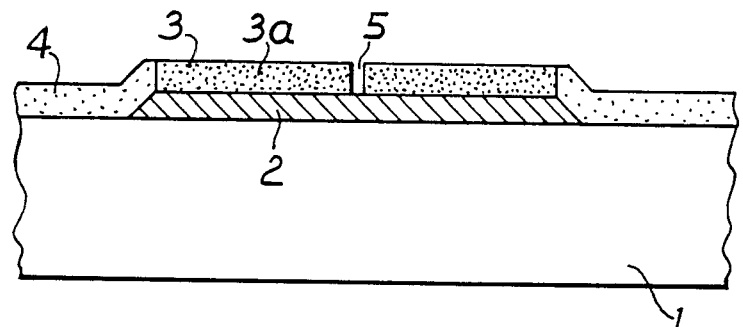

United States Patent [19]

Evans et al.

[11] Patent Number: 4,849,071

[45] Date of Patent: * Jul. 18, 1989

[54] METHOD OF FORMING A SEALED DIAPHRAGM ON A SUBSTRATE

[75] Inventors: Alan G. R. Evans, Eastleigh; Mohammed M. Farooqui, Southampton, both of England

[73] Assignee: Spectrol Reliance Limited, Swindon, United Kingdom

[*] Notice: The portion of the term of this patent subsequent to Jul. 18, 2006 has been disclaimed.

[21] Appl. No.: 131,058

[22] Filed: Dec. 9, 1987

[30] Foreign Application Priority Data

Dec. 13, 1986 [GB] United Kingdom ............... 8629819

[51] Int. Cl.⁴ .................................. H01L 29/84
[52] U.S. Cl. .................... 156/644; 156/657; 156/662; 437/228; 437/233; 437/927; 437/968; 357/26; 29/621.1
[58] Field of Search ............. 156/630, 643, 646, 644, 156/655, 657, 659.1, 662; 148/DIG. 159; 437/927, 228, 968, 233, 921, 901; 73/715, 720, 721, 724, 726, 727, DIG. 4; 357/26; 29/601 SG; 338/4; 92/103 SD

[56] References Cited

U.S. PATENT DOCUMENTS

| | | | |
|---|---|---|---|
| 4,262,399 | 4/1981 | Cady | 29/25.42 |
| 4,581,624 | 4/1986 | O'Connor | 357/26 |
| 4,597,003 | 6/1986 | Aine et al. | 357/26 |

Primary Examiner—David L. Lacey
Assistant Examiner—Andrew J. Anderson

[57] ABSTRACT

The invention provides a method of forming a sealed diaphragm (3) on a substrate (1) which comprises providing on the substrate (1) a sacrificial layer (2), providing a diaphragm layer (3) over the sacrificial layer (2), providing at least one aperture (5) in the diaphragm layer (3) which is spaced from the periphery of the diaphragm layer (3), at least partially removing the sacrificial layer (2) from between the substrate (1) and the diaphragm layer (3) by way of the at least one aperture (5) and closing the at least one aperture (5).

31 Claims, 2 Drawing Sheets

METHOD OF FORMING A SEALED DIAPHRAGM ON A SUBSTRATE

CROSS REFERENCE TO RELATED APPLICATIONS

This application is related to U.S. Ser. No. 131,059, filed Dec. 9, 1987, corresponding to British Application No. 8629817, and to U.S. Ser. No. 131,057, filed Dec. 9, 1987, British Application No. 8629818.

The present invention relates to a method of forming a sealed diaphragm on a substrate.

It is known to form sealed diaphragm structures comprising a polysilicon diaphragm on a silicon substrate by depositing or thermally growing on the substrate a sacrificial oxide layer having a plurality of arms of reduced thickness which extend outwardly thereof and serve to define etch channels, providing a polysilicon layer over the sacrificial layer so that the polysilicon layer covers the whole of the sacrificial layer except for said arms, and removing the sacrificial layer by etching to leave the polysilicon diaphragm on the substrate. The apertures around the periphery of the diaphragm formed when the arms of the sacrificial layer are removed are then sealed, usually with silicon dioxide which is deposited or grown to fill the apertures. This known method of forming diaphragm structures has the disadvantages that the diaphragm structure is not isotropic about the periphery of the diaphragm due to the presence of the sealing material and that the separation of the diaphragm from the substrate is not uniform due to the reduced thickness of the arms of the sacrificial layer.

The present invention has as its object to provide a method of forming a sealed diaphragm on a substrate which overcomes the aforesaid disadvantages.

The present invention provides a method of forming a sealed diaphragm on a substrate which comprises the steps of:

(a) providing on the substrate a sacrificial layer;

(b) providing a diaphragm layer over said sacrificial layer;

(c) providing at least one aperture in said diaphragm layer which is spaced from the periphery of the diaphragm layer;

(d) at least partially removing said sacrificial layer from between said substrate and said diaphragm layer by way of said at least one aperture, and (e) closing said at least one aperture.

Said substrate may be a silicon substrate, said sacrificial layer may be formed from silicon dioxide and/or said diaphragm layer may be formed from polysilicon.

The sacrificial layer may be deposited or grown on the substrate and may then be patterned, e.g. etched, to the desired diaphragm configuration.

The diaphragm layer may overlap the sacrificial layer at all points around the periphery thereof. The diaphragm layer may be deposited or grown over the sacrificial layer and may then be patterned, e.g. etched, to the required shape.

The at least one aperture in the diaphragm layer may be formed in any suitable manner such as by photoetching, laser drilling, electroerosion, microalloying and etching, locally oxidizing or by forming a protrusion on the sacrificial layer, forming the diaphragm layer and planarization to remove said protrusion.

The sacrificial layer may be at least partially removed from between the substrate and the diaphragm layer by etching, e.g. using hydrogen fluoride as the etchant.

The at least one aperture in the diaphragm is then closed by depositing or growing a sealing material, such as silicon dioxide, in said aperture and/or over said diaphragm layer, e.g. as by chemical vapour deposition, preferably at low pressure, or by thermal oxidation in oxygen, both of which result in a reduced pressure being obtained in the cavity formed between the diaphragm and the substrate. If desired, the sealed diaphragm structure can then be heat treated to remove any residual oxygen by forming silicon dioxide.

The diaphragm layer may be chemically and/or thermally treated to impart required electrical or physical properties thereto either before or after the at least partial removal of said sacrificial layer. For example, the diaphragm may be thermally annealed to reduced stress in the diaphragm, can be doped by implantation or diffusion by any known technique to provide the diaphragm with required electrical properties, or the diaphragm can be plated or metallized to obtain desired mechanical and/or electrical properties.

The method of the invention may further comprise forming the diaphragm layer from an electrically conductive material which can be converted to a dielectric and, after closing said at least one aperture, providing a mask over a part of said diaphragm, e.g. over a central area thereof, and converting the unmasked part of the diaphragm, e.g. the peripheral margin of the diaphragm, to a dielectric, as more fully described and claimed in our copending U.S. Application Ser. No. 131,057, corresponding to British Application No. 8629818. Thus, for example, where the diaphragm is formed from polysilicon, a silicon nitride mask may be deposited on the diaphragm and may be patterned, e.g. etched, to mask a required part of the diaphragm and the unmasked part of the diaphragm then oxidized to convert it to silicon dioxide.

Electric connecting tracks can be provided by metallizing the diaphragm and etching away the unwanted metal to leave the required connecting tracks.

If desired a plurality of diaphragms, which are of the same or of different sizes, can be formed simultaneously on a single substrate.

Figure 2:
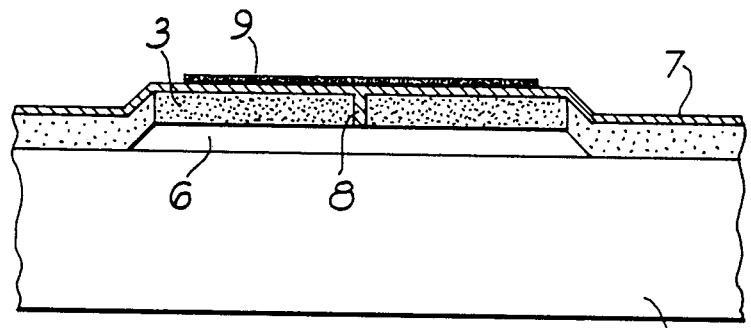
Figure 3:
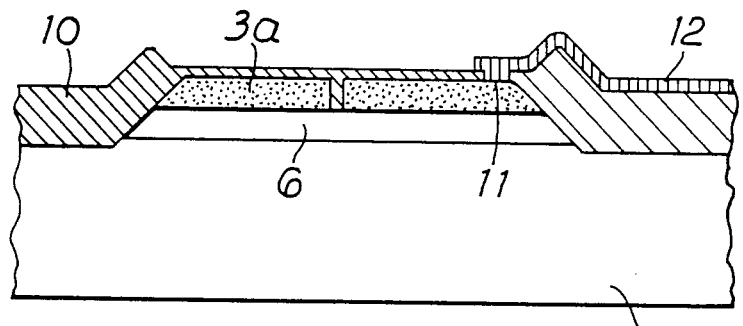
Figure 4:
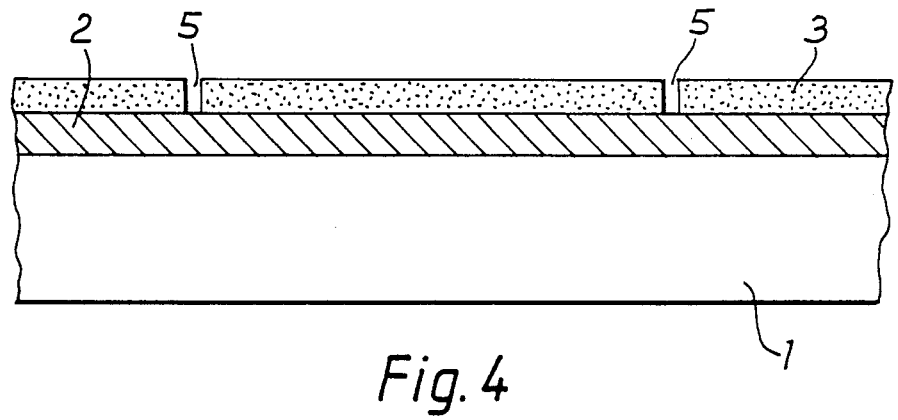
Figure 5:
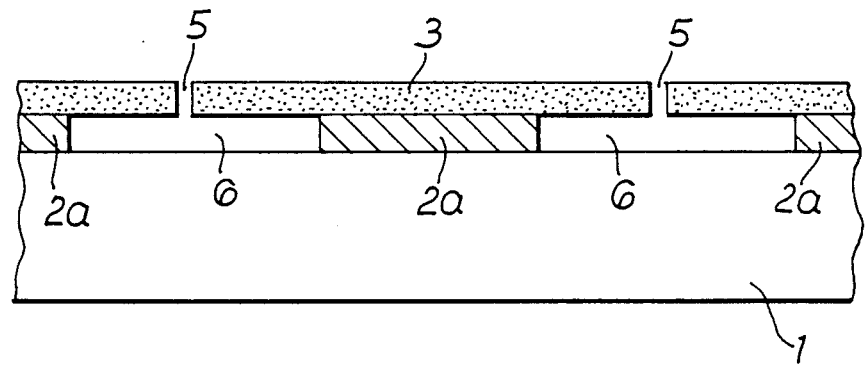

The invention will be more particularly described with reference to the accompanying diagrammatic drawings, in which:

FIGS. 1, 2 and 3 are sectional elevations showing various stages in the forming of a sealed diaphragm structure in accordance with one embodiment of the method of the present invention, and FIGS. 4 and 5 are sectional elevations of steps in a method of forming a sealed diaphragm structure in accordance with another embodiment according to the present invention.

Referring to the drawings, FIG. 1 shows a silicon substrate 1 on which a sacrificial layer 2 of silicon dioxide has been deposited or thermally grown and then patterned, e.g. etched, to the required shape of the diaphragm. A polysilicon diaphragm layer 3 has been provided, e.g. deposited, over the sacrificial layer 2 so that the diaphragm layer 3 overlaps the sacrificial layer 2 around the periphery thereof so as to be in contact with and bonded to the substrate 1 as shown at 4. An aperture 5 is provided centrally of the diaphragm layer 3 in any suitable manner, such as by photoetching, laser drilling, electroerosion, microalloying and etching, locally oxidizing, or forming a protrusion (not shown) in the sacrificial oxide layer 2 prior to forming the diaphragm layer 3 and subsequent planarization of the diaphragm layer 3 to remove the protrusion and form the aperture 5. The sacrificial layer 2 is then removed by etching, e.g. in hydrogen fluoride, to form a cavity 6 (FIG. 2) between the substrate 1 and the diaphragm layer 3. Residual etchant is removed by rinsing and evaporation at normal or reduced ambient pressure. If desired the diaphragm layer 3 can be thermally treated at this stage to reduce the internal stress in the diaphragm. The aperture 5 is then sealed by depositing a layer 7 of silicon dioxide over the diaphragm layer 3 so that the silicon dioxide fills the aperture 5 as shown at 8. The silicon dioxide layer 7 may be deposited in any well known manner such as by chemical vapor deposition, preferably at low pressure, or by thermal oxidation in oxygen. In both of these processes the pressure within the cavity 6 is reduced to sub-atmospheric. Any residual oxygen can be removed by a further heat treatment to form silicon dioxide.

The diaphragm forming portion 3a of the diaphragm layer 3 can be doped by implantation or otherwise to impart required electrical characteristics thereto whilst the overlapping margins 4 of the diaphragm layer 3 can be left untreated. The doping of the portion 3a can be effected at any suitable stage in the process.

If desired, and in order to provide a better electrical isolation of the diaphragm portion 3a from the substrate 1, the overlapping margin 4 of the diaphragm layer 3 can be converted to silicon dioxide which has good dielectric properties. This conversion of the diaphragm margin 4 to a dielectric can be effected by providing, e.g. depositing, a masking layer 9 of silicon nitride over the diaphragm portion 3a and patterning, e.g. etching, the masking layer 9 to the required size. The unmasked portion 4 of the diaphragm layer 3 is then oxidized to convert it to silicon dioxide so that the polysilicon diaphragm portion 3a is completely electrically isolated from the substrate 1 by dielectric material 10 as shown in FIG. 3. The silicon nitride masking layer 9 can be removed by etching and the material 10 patterned as shown at 11 to provide for contact with the diaphragm portion 3a. An electrically conductive metal layer can then be deposited on the diaphragm and etched to remove surplus metal to provide one or more electrically conductive tracks 12 in electrical contact with the diaphragm portion 3a.

In the embodiment shown in FIGS. 4 and 5, in which like parts have been given like reference numerals, the diaphragm layer 3 does not overlap the sacrificial layer 2 but is spaced from the substrate 1 by the sacrificial dielectric silicon dioxide sacrificial layer 2. The sacrificial layer 2 is then partially removed by etching through one or more apertures 5 as shown in FIG. 5 to define or more cavities 6 between the diaphragm layer 3 and the substrate 1. The remaining portions 2a of the silicon dioxide sacrificial layer 2 then serve to electrically isolate the diaphragm layer 3 from the substrate 1. The one or more apertures 5 are then closed as previously described in connection with the embodiment of FIGS. 1 to 3.

The method of the present invention has the advantages of providing isotropy of the diaphragm structure around its entire periphery as no separate sealing material has to be introduced and also provides uniform separation of the diaphragm from the substrate as no reduced thickness side arms are required on the sacrificial layer to provide the etch channels. With the embodiment of FIGS. 1 to 3, over-etching has no significant effect on either the diaphragm or the substrate and accordingly different sized diaphragms can be fabricated simultaneously on the same substrate.

EXAMPLE

The fabrication steps were as follows:

(a) The silicon single crystal substrate (orientation <111> and of p-type resistivity <0.05 ohm cm) was chemically cleaned using the commercially available 'RCA' etch.

(b) The polished face of the slice was oxidized in wet oxygen at 1100° C. for 3 hours to form an oxide layer 1.2 $\mu$m thick.

(c) The layer was photo-etched to form islands which would later define the cavity.

(d) Polysilicon was next deposited to a thickness of 1 $\mu$m using LPCVD from silane at 630° C.

(e) The polysilicon was plasma etched to form an island covering the oxide island everywhere and overlapping it by about 10%. A hole of ~1$\mu$ diameter was etched in the center of the polysilicon diaphragm at the same time. This was obtained by allowing the photoresist masking layer to flow thermally reducing the etching window size as much as possible. An alternative technique used an electrolytically sharpened tungsten point pushed into the photo resist to form the window. The resist was then thermally reflowed. An indentation was left in the resist after the point was withdrawn and subsequent plasma etching produced the required aperature.

(f) The top surface of the slice was then implanted with $5 \times 10^{15}$cm$^{-2}$ phosphorus ions at 40 KeV to dope the polysilicon n-type but only over the cavity area using photo masking.

(g) The slice was immersed in concentrated hydroflouric acid for 3 hours to etch away all oxide and leave a cavity. Etching fluid remaining in the cavity was diluted in deionized water and was removed by slow evaporation.

(h) The apertures were sealed with a layer of 4000A of silicon dioxide (LTO) from silane and oxygen in a LPCVD furnace at 430° C.

(i) A 1000A layer of silicon nitride was deposited from dichloro-silane and ammonia in a LPCVD furnace at 740°.

(j) The nitride was photo-patterned to cover the polysilicon diaphragm and protect it from subsequent oxidation.

(k) LOCOS oxidation was carried out at 1100° C. for 30 minutes and oxidized the uncovered polysilicon completely. This step also activated the implant of step (h), relieved stress in the polysilicon, densified the LTO of step (j) and reduced the residual pressure in the cavity.

(l) A window was etched in the LTO and nitride layers using photo masking and chemical etching leaving the bare polysilicon diaphragm exposed.

(m) Aluminum metallization was electron beam evaporated to 0.2 $\mu$m thickness to contact the diaphragm periphery and to 1 $\mu$m thickness in a separate step to form the aluminum connecting tracks and bonding pads. The patterns were defined by photo etching.

(n) The aluminum was alloyed into the diaphragm by furnace treatment at 450° C. for 30 minutes in a forming gas ambient.

The diaphragms thus produced were isotropic in radial deflection as observed interferometically.

Diaphragm structures fabricated in accordance with the present invention are useful for use in capacitance transducers, microphones, rupture discs, resonators, vibrators and like devices.

We claim:

1. A method of forming a sealed diaphragm on a substrate comprising the steps of:
   (a) providing on the substrate a sacrificial layer;
   (b) providing a diaphragm layer over said sacrificial layer, said diaphragm layer being formed from an electrically conducting material which can be converted to a dielectric;
   (c) providing at least one aperture in said diaphragm layer which is spaced from the periphery of the diaphragm layer;
   (d) at least partially removing said sacrificial layer from between said substrate and said diaphragm layer by way of said at least one aperture,
   (e) closing said at least one aperture, and
   (f) providing a mask over a part of said diaphragm and converting the unmasked part of the diaphragm to a dielectric.

2. A method according to claim 1, wherein said substrate is a silicon substrate.

3. A method according to claim 2, wherein said sacrificial layer is formed from silicon dioxide.

4. A method according to claim 3, wherein said diaphragm layer is formed from polysilicon.

5. A method according to claim 4, wherein said sacrificial layer is deposited or grown on the substrate.

6. A method according to claim 5, wherein said deposited or grown sacrificial layer is patterned to the predetermined diaphragm configuration.

7. A method according to claim 6, wherein said diaphragm layer overlaps said sacrificial layer at all points around the periphery thereof.

8. A method according to claim 7, wherein the diaphragm layer is deposited over the sacrificial layer.

9. A method according to claim 8, wherein the deposited diaphragm layer is patterned to the predetermined shape.

10. A method according to claim 9, wherein said at least one aperture is formed in the diaphragm layer by photoetching, laser drilling, electro erosion, microalloying and etching, locally oxidizing or by forming a protrusion on the sacrificial layer, forming the diaphragm layer and planarization to remove said protrusion.

11. A method according to claim 10, wherein said sacrificial layer is at least partially removed from between the substrate and the diaphragm layer by etching.

12. A method according to claim 11, wherein hydrogen fluoride is used as the etchant.

13. A method according to claim 12, wherein said at least one aperture is closed by depositing a sealing material in said aperture or over said diaphragm layer.

14. A method according to claim 13, wherein silicon dioxide is deposited in said at least one aperture.

15. A method according to claim 14, wherein the diaphragm layer is chemically or thermally treated to impart predetermined electrical or physical properties thereto.

16. A method according to claim 15, wherein said mask is provided over a central diaphragm area of said diaphragm and the peripheral margin of the diaphragm is converted to a dielectric.

17. A method according to claim 16, wherein a silicon nitride mask is deposited on said diaphragm and patterned to mask a predetermined part of the diaphragm and the unmasked part of the diaphragm is then oxidized to convert it to silicon dioxide.

18. A method according to claim 17, wherein electric connecting tracks are provided by metallizing the diaphragm and etching away the unwanted metal to leave the connecting tracks.

19. A method according to claim 18, which comprises simultaneously forming a plurality of diaphragms on a single substrate.

20. A method according to claim 1, wherein said sacrificial layer is formed from silicon dioxide.

21. A method according to claim 1, wherein said diaphragm layer is formed from polysilicon.

22. A method according to claim 1, wherein said sacrificial layer is deposited or grown on the substrate.

23. A method according to claim 22, wherein said deposited or grown sacrificial layer is patterned to the predetermined diaphragm configuration.

24. A method according to claim 1, wherein said diaphragm layer overlaps said sacrificial layer at all points around the periphery thereof.

25. A method according to claim 1 wherein the diaphragm layer is deposited over the sacrificial layer and the deposited diaphragm layer is patterned to the required shape.

26. A method according to claim 1, wherein said at least one aperture is formed in the diaphragm layer by photoetching, laser drilling, electro erosion, microalloying and etching, locally oxidizing or by forming a protrusion on the sacrificial layer, forming the diaphragm layer and planarization to remove said protrusion.

27. A method according to claim 1, wherein said sacrificial layer is at least partially removed from between the substrate and the diaphragm layer by etching.

28. A method according to claim 1, wherein said at least one aperture is closed by depositing a sealing material in said aperture or over said diaphragm layer.

29. A method according to claim 1, wherein silicon dioxide is deposited in said at least one aperture sufficiently to close said aperture.

30. A method according to claim 1, wherein said mask is provided over a central diaphragm area of said diaphragm and the peripheral margin of the diaphragm is converted to a dielectric.

31. A method according to claim 1, wherein said diaphragm layer is formed from polysilicon, a silicon nitride mask is deposited on said diaphragm and patterned to mask a predetermined part of the diaphragm and the unmasked part of the diaphragm is then oxidized to convert it to silicon dioxide.

* * * * *